(12) United States Patent  
Vogel et al.

(10) Patent No.: US 9,073,416 B2
(45) Date of Patent: Jul. 7, 2015

(54) ADJUSTABLE BAIL ARM COUPLING

(75) Inventors: John Vogel, Columbus, IN (US); Ryan Reeder, Carmel, IN (US)

(73) Assignee: Aero Industries, Inc., Indianapolis, IN (US)

( * ) Notice: Subject to any disclaimer, the term of this patent is extended or adjusted under 35 U.S.C. 154(b) by 924 days.

(21) Appl. No.: 13/181,593

(22) Filed: Jul. 13, 2011

(65) Prior Publication Data

US 2013/0015418 A1    Jan. 17, 2013

(51) Int. Cl.
    B66F 3/00 (2006.01)
    B60J 7/08 (2006.01)
(52) U.S. Cl.
    CPC ........................................ B60J 7/085 (2013.01)
(58) Field of Classification Search
    USPC ................. 254/129, 134, 133 R, 100, 102;
        135/144; 296/98, 100.14, 100.15,
        296/100.16, 120.1; 403/73, DIG. 9, 83–85
    See application file for complete search history.

(56) References Cited

U.S. PATENT DOCUMENTS

| | | | |
|---|---|---|---|
| 6,032,917 A * | 3/2000 | Shannon | 248/514 |
| 6,637,800 B2 | 10/2003 | Henning | |
| 7,370,904 B2 | 5/2008 | Wood, Jr. et al. | |
| 2005/0242612 A1* | 11/2005 | O'Brian et al. | 296/98 |
| 2007/0102951 A1* | 5/2007 | Chenowth | 296/98 |
| 2007/0209688 A1* | 9/2007 | Earnshaw | 135/16 |
| 2009/0315356 A1* | 12/2009 | Stueber | 296/24.34 |

* cited by examiner

*Primary Examiner* — Lee D Wilson
*Assistant Examiner* — Nirvana Deonauth
(74) *Attorney, Agent, or Firm* — Maginot, Moore & Beck, LLP

(57) ABSTRACT

A bail arm assembly for a retractable tarp or cover system for a container, comprises a lower arm configured to be pivotably mounted relative to the container, an upper arm configured to support the tarp or cover, and an adjustable coupling connecting the lower arm to the upper arm. The adjustable coupling includes a pair of opposing engagement faces configured to permit selective adjustment of the angular relationship between the lower and upper arms at discrete angular intervals.

18 Claims, 3 Drawing Sheets

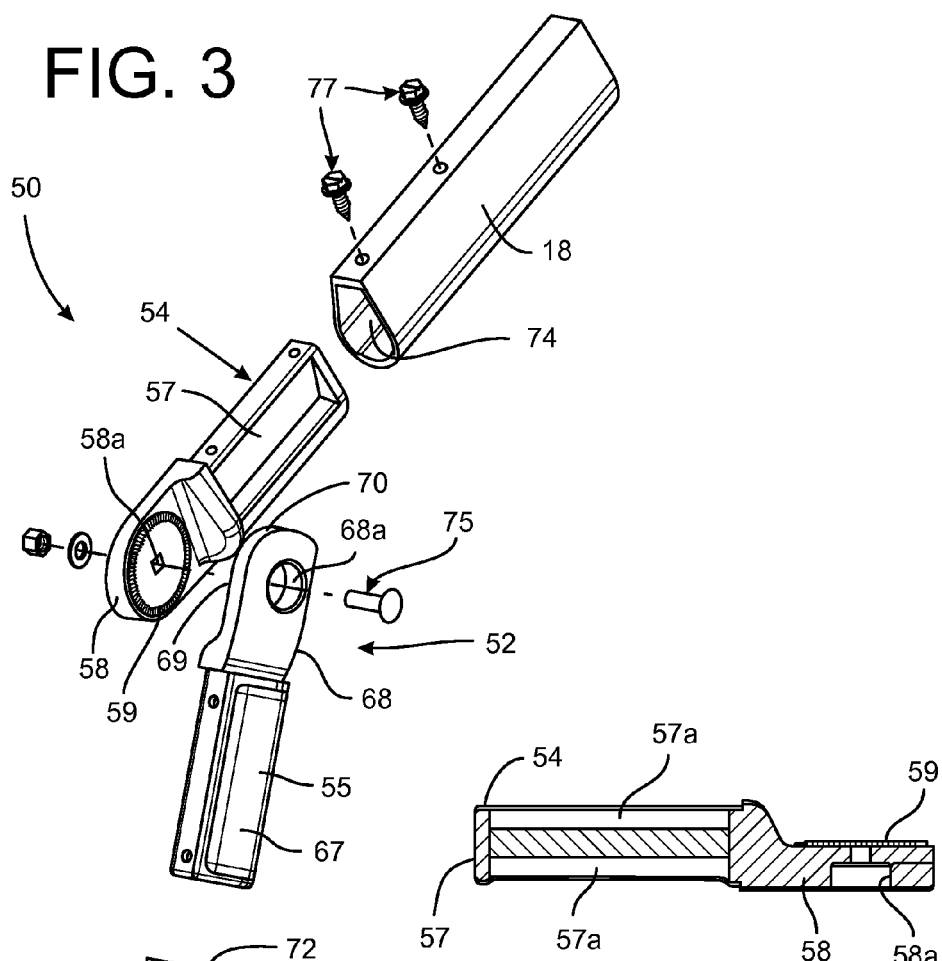
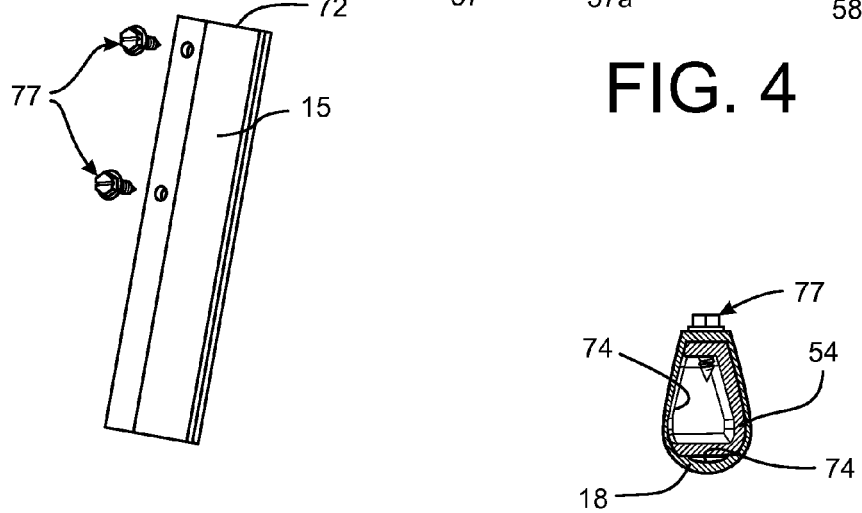

ADJUSTABLE BAIL ARM COUPLING

BACKGROUND

The present invention relates to tarping systems for containers, such as dump bodies, transfer containers and the like. More particularly, the invention relates to the bail arms used to extend and retract the tarpaulin or cover across the open top of the container.

Tarping systems for containers, particular containers carried by a vehicle, are well-known. Two examples are shown in FIGS. 1 and 2. The transfer container 10 in FIG. 1 is carried by a truck T. Bail arms 14 carry a tarpaulin or cover 22 and are pivotably mounted to the container at a pivot mount 17 to extend the tarp across the top 12 of the container 10, with the bail arms in the extended position 14'. In one configuration, the bail arms 14 include a lower arm 15, a joint 16 and an upper arm 18 that carries a spool 20 onto which the tarp 22 is wound. In some systems, the spool is mounted on a gantry and the upper arm is connected to a cross-bar fastened to the end of the tarp. The bail arms are typically spring-driven at the pivot mount 17 for extension with a motor-driven spool for retracting the tarp.

In another container system, a dump body 25 includes a tarp 26 that extends or retracts over the open top of the dump body. One or more bail arms 27 are pivotably mounted to the container at corresponding pivot mounts 31 to carry the tarp across the dump body. The bail arms include a lower arm 28, a joint 29 and an upper arm 30 connected to the tarp 26. One or more of the bail arms may be spring-driven at the corresponding pivot mount 31 for extension or retraction, with a manual pull or a motor drive working against the spring-drive feature.

In both systems the joint 16, 29 between the lower and upper arms (15, 28 and 18, 30) is fixed, meaning that the upper arm is at a fixed angular relationship to the lower arm. This fixed relationship can be acceptable for many container sizes and configurations; however, the fixed angle does not permit flexibility in accommodating a tarping system to a particular container. For instance, the transfer container 10 shown in FIG. 1 may be shorter than depicted, or the particular fixed angle does not pull the tarp tight and relatively flat across the open top 12 of the container. Similar problems may arise with respect to the dump body of FIG. 2.

SUMMARY

In one aspect, a tarping system includes an adjustable coupling between the lower and upper arms of the tarping system bail arms. The lower arm is configured to be pivotably mounted relative to the container while the upper arm is configured to support the tarp or cover. The adjustable coupling includes a pair of opposing engagement faces configured to permit selective adjustment of the angular relationship between the lower and upper arms at discrete angular intervals.

In one aspect the adjustable coupling includes two identical components, each including a corresponding engagement face. The components further include an elongated body configured to fit within the hollow passage of a corresponding bail arm. Fasteners, such as metal screws, can be used to fasten the coupling components to the bail arms.

In a further aspect, each component includes a head portion that carries a corresponding engagement face. The engagement face is configured for interdigitating engagement, such as by way of radial teeth or splines. The interdigitating engagement face is configured to permit discrete adjustment of the angular relationship between bail arm members, such as discrete five degree adjustments. The engagement face is further configured to permit adjustment of the angular relationship from a linear arrangement (i.e., 180°) to a predetermined angular offset up or down, such as ±102.5°. A clamping assembly is operable to clamp the two components together at a desired angular orientation.

DESCRIPTION OF THE FIGURES

FIG. 3 is an exploded view of an adjustable coupling for use in the bail arms of a container coupling system, such as the systems shown in FIGS. 1-2.

FIG. 4 is a top cross-sectional view of a component of the adjustable coupling shown in FIG. 3.

FIG. 5 is an end cross-sectional view of the engagement between the adjustable coupling and a bail arm.

DETAILED DESCRIPTION

Figure 1:
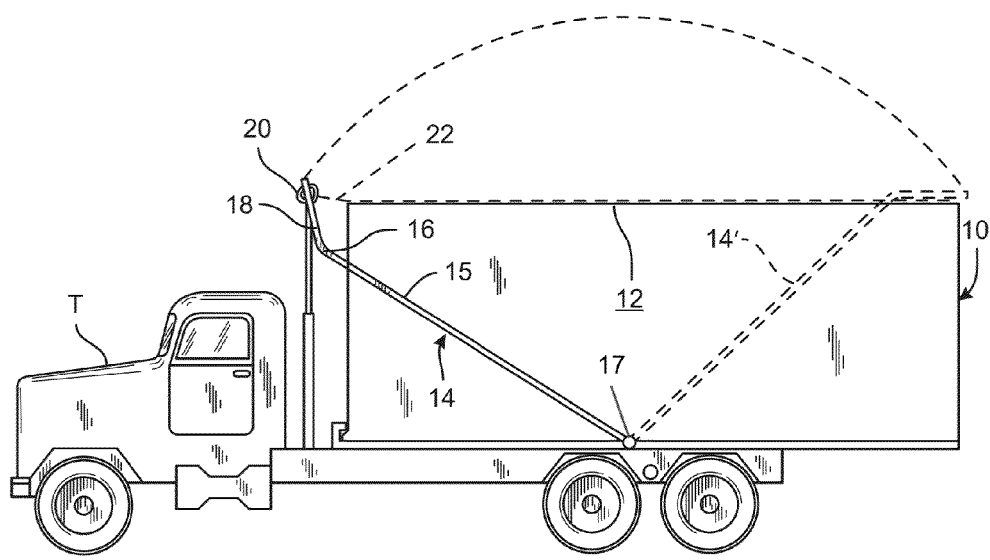
FIG. 1 is a depiction of a prior art container tarping system.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
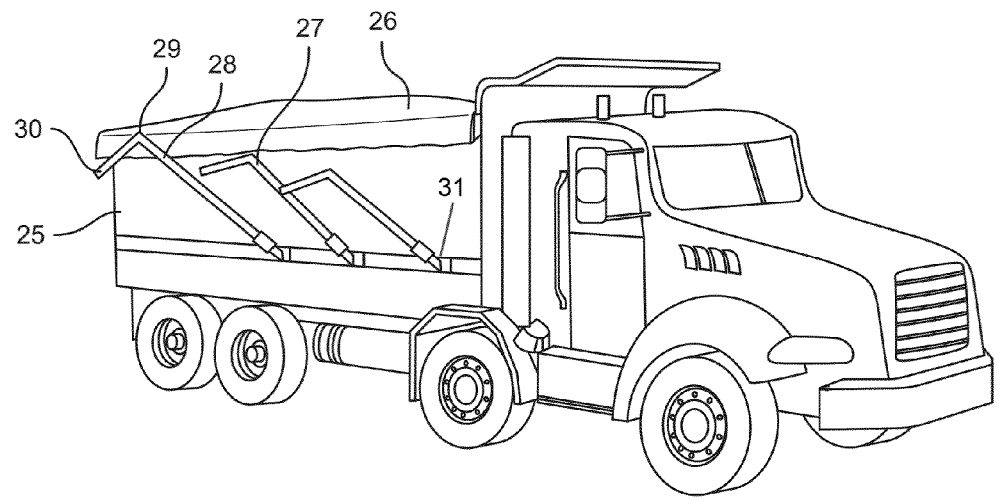
FIG. 2 is a depiction of another prior art container tarping system.

A bail arm assembly 50 is shown in FIG. 3 which includes an adjustable arm coupling 52 connecting the lower arm 15 to the upper arm 18. It is understood that the lower and upper arms, including the pivot mounts, may be similar to the bail arm components shown in FIGS. 1 and 2, or any other bail arm construction used for retractable/extendable tarping system. In one embodiment, the adjustable arm coupling 52 includes an upper component 54 and a lower component 55 that are pivotably and adjustably engaged, as explained in more detail herein. In one aspect, the two components 54, 55 may be identically configured for ready interchangeability when installing the arm coupling in a bail arm assembly.

The two components 54, 55 include an elongated body 57, 67 that is adapted for a close-fit engagement within the hollow passage 72, 74 in a respective lower or upper bail arm 15, 18. It can be appreciated that the elongated bodies 57, 67 exhibit a profile or cross-sectional shape that may generally conforms to the profile or cross-sectional shape of the hollow passage 74. This conformity helps seat the body 57, 67 within the bail arm component 28, 30 and prevents relative rotation between the parts. The cross-sectional shape of the elongated bodies 57, 67 may be modified to reduce the amount of material while retaining sufficient strength to endure the bail arm loads without compromise. Thus, as shown in the cross-sectional view of FIG. 4, the body 57 may incorporate a hollowed portion 57a on opposite sides of the body to reduce the material requirements. The elongated bodies are fastened to the corresponding bail arm component by appropriate fasteners 77, which may be, for instance, sheet metal screws.

Figure 6:
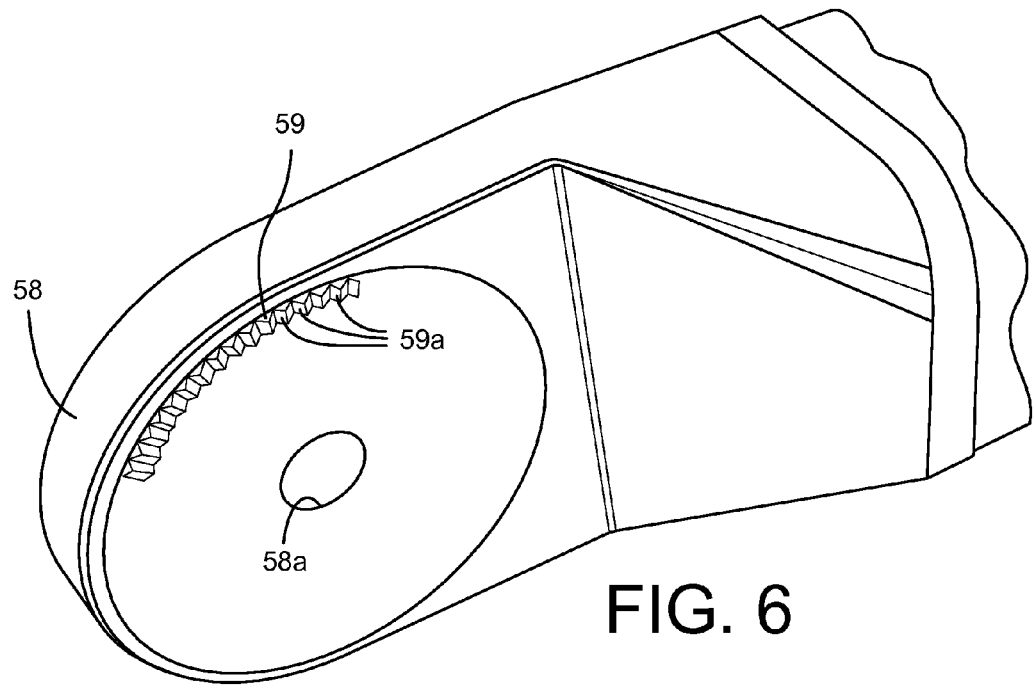
FIG. 6 is an enlarged perspective view of the angle adjustment feature of the adjustable coupling shown in FIG. 3.

Returning to FIG. 3, the components 54, 55 include head portions 58, 68 that are configured for adjustable mating engagement. In one embodiment, the head portions define an engagement face 59, 69 adapted for selective adjustable engagement at various discrete relative angular orientations. In one specific embodiment the engagement faces 59, 69 may incorporate a series of radial splines or teeth 59a adapted for interdigitating engagement, as shown in FIG. 6. The head portion may incorporate an angle indicator with visible indicia indicative of the relative angle defined by the engagement of the two components 54, 55.

Figure 7:
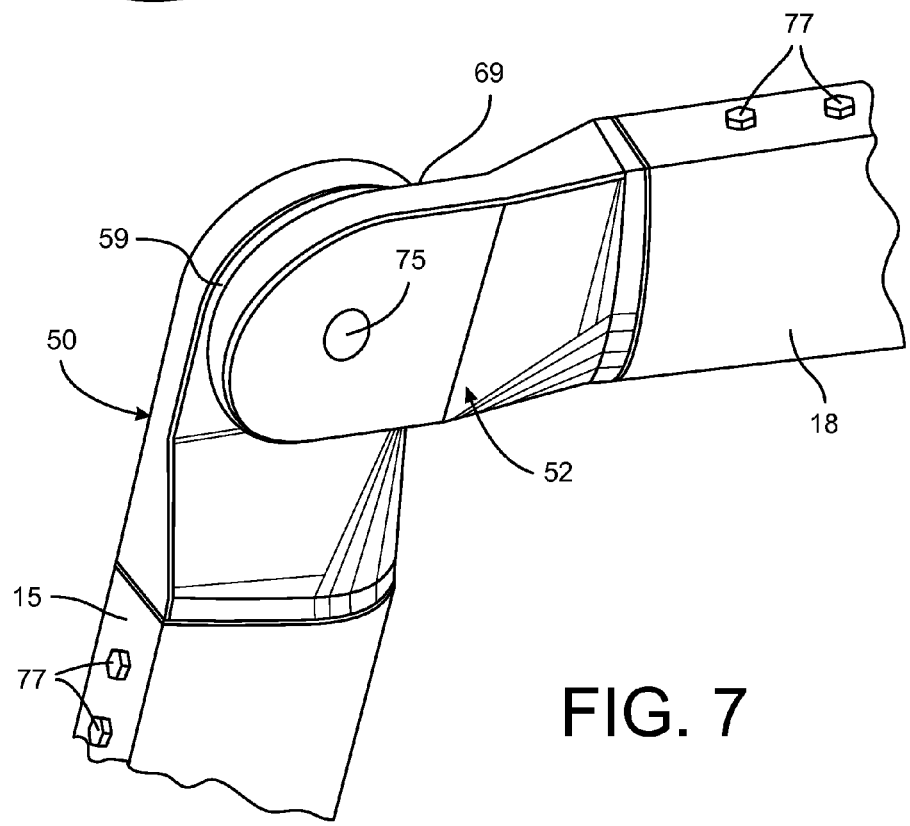
FIG. 7 is a perspective view of the adjustable coupling of FIG. 3 shown in its assembled configuration.

Once the two components are oriented at a desired angle, as shown in FIG. 7, the upper and lower components 54, 55 can be clamped together using a clamping assembly 75. The clamping assembly extends through a corresponding bore 58a, 68a in the two components. In one embodiment the clamping assembly 75 may include a carriage bolt, washer and nut, as shown in FIG. 3. One or both of the bores 58a, 68a may be configured with a square cross-section to mate with a corresponding square cross-section on the carriage bolt of the clamping assembly 75. Tightening the clamping assembly fixes the interdigitating engagement between the engagement surfaces 59, 69. The clamping assembly may be spring biased so that when the assembly 75 is loosened the two components are pushed slightly apart so that the engagement faces are clear of each other to permit relative rotation of the components. As shown in FIG. 4, one of the bores 58a may include a countersink within which the head of the carriage bolt of the assembly 75 may reside.

The engagement faces 59, 69 are configured to permit discrete gross or fine angular adjustments. In the present embodiment, the teeth or radial splines 59a (FIG. 6) are configured and arranged to provide a five degree (5°) resolution, meaning that the relative angle between bail arms components can be adjusted at five degree increments. In one specific embodiment, the angles can range from 180° in which the bail arms 15, 18 are in a straight line, plus or minus 102.5° upward or downward. In other words, the head portions 58, 68 may be configured for a 205° range of relative angular motion between the components. As shown in FIGS. 3, 6, the inter-engagement features on the engagement faces 59, 69 may extend a full 360°, even though the relative range of motion may be limited to 205°. The full 360° engagement feature ensures a firm engagement between the bail arm members so that the relative angular positions do not slip when the bail arm is under load. In one embodiment, 72 teeth or splines are arranged around the circumference of the engagement faces 59, 69. The teeth or splines can have a height of about 5/16 in.

As shown in FIG. 4, the head portion 58, 68 of the components 54, 55 are sized so that when the two head portions are inter-engaged at the engagement faces 59, 69 the overall width is approximately equal to the width of the corresponding elongated bodies 57, 67. Thus, in one embodiment the head portions 58, 68 each have a width of about 7/8 in. while the elongated bodies have a width of about 1 23/32 in., which is slightly less than the combined width of the inter-engaged head portions. The head portions are thus sized to provide a smooth transition with a corresponding bail arm, as shown in FIG. 7.

The adjustable arm coupling 52 may be formed from a material strong enough to withstand the static and vibrational loads of the typical bail arm assembly. For instance, the upper and lower components 54, 55 of the coupling may be formed of the same material as the bail arms 15, 18, such as aluminum or stainless steel. The components may be extruded, forged or cast, with appropriate machining. Alternatively, the components may be cast from a hard polymer or plastic material. The angle indicia on the angle indicators 60, 70 may be formed in the head portions 58, 68 or may be independently applied, such as a sticker or label.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A retractable cover system for a container, comprising: a cover sized to be extended over the top of the container; a bail arm assembly connected to the cover, including; a lower arm including a pivot mount at one end thereof for pivotably mounting said lower arm to the container; an upper arm configured to support the cover; and an adjustable coupling connecting said lower arm to said upper arm, said adjustable coupling including a pair of opposing engagement faces configured to permit selective adjustment of the angular relationship between said lower and upper arms at discrete angular intervals and a clamping assembly for clamping said opposing engagement faces together at a selected angular relationship; wherein said clamping assembly comprises a bolt extending through a corresponding bore in each of said opposing engagement face.

2. The retractable cover system according to claim 1, wherein said engagement faces each include a plurality of interdigitating radial teeth.

3. The retractable cover system according to claim 2, wherein the interdigitating radial teeth are arranged to permit discrete adjustments in five degree (5°) angular increments.

4. The retractable cover system according to claim 2, wherein the interdigitating radial teeth are configured to permit at least a 205 degree range of relative angular adjustment between said lower and upper arms.

5. The retractable cover system according to claim 4, wherein the interdigitating radial teeth are configured to permit a 102.5 degree range of relative angular adjustment from a position in which said lower and upper arms are linearly aligned.

6. The retractable cover system according to claim 1, wherein:
said lower arm and said upper arm each include an elongated passage; and
said adjustable coupling includes a lower component and an upper component, each component including;
an elongated body configured for a close fit within said passage of a corresponding one of said lower and upper arm; and
a head portion having a corresponding one of said opposing engagement faces.

7. The retractable cover system according to claim 6, wherein said elongated body of said lower and upper component has a profile corresponding to the profile of said passage in said corresponding lower and upper arm.

8. The retractable cover system according to claim 6, wherein said lower component and said upper component are identically configured and interchangeable.

9. The retractable cover system according to claim 6, further comprising fasteners for fastening said lower and upper component to a corresponding one of said lower and upper arm.

10. A retractable cover system, comprising: an elongated container having an open top and a length; a cover sized to be extended along the length of the top of the container;

a bail arm assembly connected to the cover, including; a lower arm; an upper arm configured to support the cover; an adjustable coupling connecting said lower arm to said upper arm, said adjustable coupling including a pair of opposing engagement faces configured to permit selective adjustment of the angular relationship between said lower and upper arms at discrete angular intervals and a clamping assembly for clamping said opposing engagement faces together at a selected angular relationship; wherein said clamping assembly comprises a bolt extending through a corresponding bore in each of said opposing engagement face; and a pivot mount connecting one end of said lower arm to said container for pivotably mounting said bail arm relative to the container, whereby pivoting the bail arm assembly relative to the container extends or retracts said cover along the length of the top of said container.

11. The retractable cover system according to claim 10, wherein said engagement faces each include a plurality of interdigitating radial teeth.

12. The retractable cover system according to claim 11, wherein the interdigitating radial teeth are arranged to permit discrete adjustments in five degree (5°) angular increments.

13. The retractable cover system according to claim 11, wherein the interdigitating radial teeth are configured to permit at least a 205 degree range of relative angular adjustment between said lower and upper arms.

14. The retractable cover system according to claim 13, wherein the interdigitating radial teeth are configured to permit a 102.5 degree range of relative angular adjustment from a position in which said lower and upper arms are linearly aligned.

15. The retractable cover system according to claim 10, wherein:
said lower arm and said upper arm each include an elongated passage; and
said adjustable coupling includes a lower component and an upper component, each component including;
an elongated body configured for a close fit within said passage of a corresponding one of said lower and upper arm; and
a head portion having a corresponding one of said opposing engagement faces.

16. The retractable cover system according to claim 15, wherein said elongated body of said lower and upper component has a profile corresponding to the profile of said passage in said corresponding lower and upper arm.

17. The retractable cover system according to claim 15, wherein said lower component and said upper component are identically configured and interchangeable.

18. The retractable cover system according to claim 15, further comprising fasteners for fastening said lower and upper component to a corresponding one of said lower and upper arm.

* * * * *